A. A. BROOKS.
WHEAT STEAMER.
APPLICATION FILED NOV. 30, 1908.
926,465.
Patented June 29, 1909.
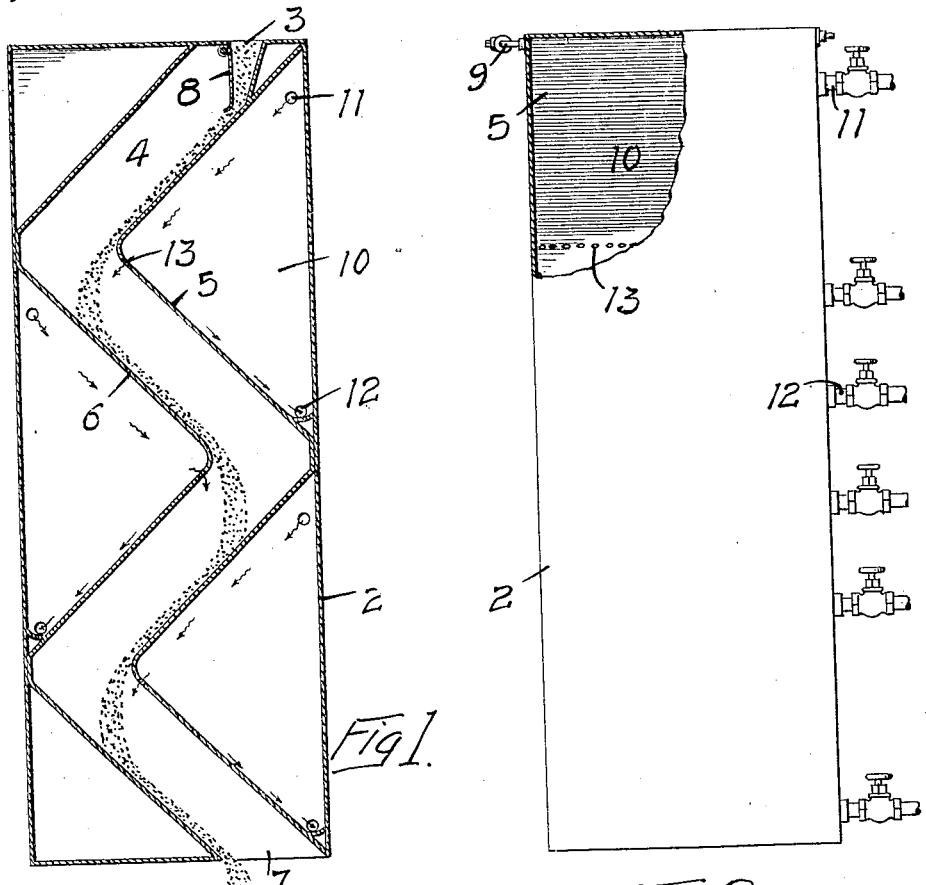
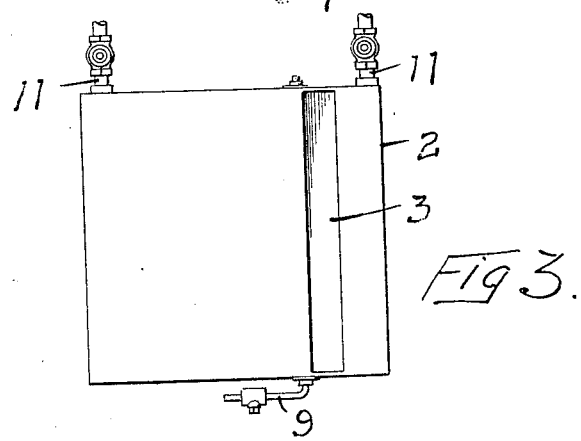
WITNESSES
INVENTOR
ALBERT A. BROOKS
BY Paul & Paul
HIS ATTORNEYS
THE NORRIS PETERS CO., WASHINGTON D. C.

UNITED STATES PATENT OFFICE.

ALBERT A. BROOKS, OF SPRINGFIELD, MINNESOTA, ASSIGNOR OF ONE-HALF TO PETER BENDIXEN, OF SPRINGFIELD, MINNESOTA.

WHEAT-STEAMER.

No. 926,465.

Specification of Letters Patent.

Patented June 29, 1909.

Application filed November 30, 1908. Serial No. 465,332.

*To all whom it may concern:*

Be it known that I, ALBERT A. BROOKS, of Springfield, Brown county, Minnesota, have invented certain new and useful Improvements in Wheat-Steamers, of which the following is a specification.

The object of my invention is to provide a wheat steamer of compact, economical construction and one which will have a very large steaming capacity.

A further object is to provide a steamer, in which the steam will be absolutely dry when it comes in contact with the grain.

A further object is to provide a steamer wherein the kernels of grain will be rolled or tumbled about in passing through the steamer, thereby insuring the perfect steaming of the kernels and a uniform treatment of them.

A further object is to provide a wheat steamer, in which the grain will be fed in a thin, uniform stream the full width of the steamer.

My invention consists generally in various constructions and combinations all as hereinafter described and particularly pointed out in the claim.

In the accompanying drawings forming part of this specification, Figure 1 is a front view of a wheat steamer, embodying my invention, Fig. 2 is a side view of the same, Fig. 3 is a top view.

In the drawing, 2 represents a casing having a feed opening 3 in its upper end, leading to a zig-zag passage 4, formed by the oppositely arranged plates 5 and 6, which extend from the top to the bottom of the casing, terminating in a discharge opening 7. Below the feed opening is a spreader plate 8 controlled by a weighted lever 9, said plate, by its adjustment, regulating the flow of grain through the steamer and causing it to spread out in a thin stream, extending entirely across the steamer. The zig-zag arrangement of the passage 4 causes the stream of grain to be diverted from one side to the other of the steamer and as the kernels drop from one wall of the passage upon the opposite wall, where the direction of the passage changes, the kernels will be tumbled and rolled about so that their surfaces will be uniformly exposed to the jets of steam.

I prefer to provide a series of pockets 10, alternating in position from one side to the other of the passage 4 and extending from the top to the bottom of the steamer. These pockets are, by the arrangement of the walls of the passage, triangular in form, and in their upper walls I provide steam inlet pipes 11, through which live steam is admitted to the pockets simultaneously, or to any one of them independently of any of the others, and in the lower walls of the pockets I provide outlet or return pipes 12, through which the water of condensation is allowed to escape from the pockets. The position of the return pipes will insure the escape of the water of condensation as fast as formed and the steam will be in a uniformly dry condition when it comes in contact with the grain.

For the purpose of admitting the steam to the grain, I provide a series of perforations 13 in the walls of the pockets extending across the steamer and directly below the apex or inner point of each pocket, so that it catches the grain and mingles therewith, while it is flowing from the wall of one pocket against the opposite wall of the pocket next beneath. The complete, uniform steaming of all the grain is thus insured.

By providing the zig-zag grain passage, I am able to turn the grain over at least three times during its passage through the steamer and subject the kernels to the action of the steam at, at least, three different points. I am also able to obtain the uniform steaming of all the kernels and utilize one or more of the pockets for steaming purposes, according to the condition of the grain and the degree of steaming to which the operator desires to subject it. For instance, steam may be admitted to the upper pocket and the lower one and shut off from the intermediate pocket, if desired, or steam may be admitted to the two upper pockets and shut off from the lower one, or the two lower pockets may be utilized without the upper one.

If preferred, the steamer may be lengthened and a larger number of pockets employed and the length of the grain passage correspondingly increased.

The steamer may be made of any suitable material and its size may be varied according to the capacity desired.

This apparatus may be used for treating cereals of various kinds and may be employed as a heater for the grain, as well as a steamer.

I claim as my invention:—

A device of the class described, comprising a casing having a zig-zag grain passage therethrough, the opposite walls of said grain passage being parallel substantially with one another and extending continuously through said casing, and the walls of said grain passage and of said casing forming a series of pockets alternately arranged on opposite sides of said passage, said pockets being independent of one another, and each pocket having independent steam supply and return pipes and valves therefor, and each pocket having ports in its walls leading into said grain passage at a point near and beneath the apex of each pocket, whereby the grain as it flows through said passage from one side thereof to the other may be steamed while flowing past all of the pockets or only a portion of them, and said casing having feed and discharge openings in its ends communicating with said grain passage.

In witness whereof, I have hereunto set my hand this 24th day of November 1908.

ALBERT A. BROOKS.

Witnesses:
WM. G. FRANK,
JOHN R. SCHMID.